(12) United States Patent  
Nam et al.

(10) Patent No.: US 12,414,118 B2  
(45) Date of Patent: Sep. 9, 2025

(54) GUARD PERIOD OPTIMIZATION FOR MULTI-ANTENNA USER EQUIPMENTS

(71) Applicant: QUALCOMM Incorporated, San Diego, CA (US)

(72) Inventors: Wooseok Nam, San Diego, CA (US); Alexandros Manolakos, San Diego, CA (US); Tao Luo, San Diego, CA (US); Peter Gaal, San Diego, CA (US); Joseph Binamira Soriaga, San Diego, CA (US)

( * ) Notice: Subject to any disclaimer, the term of this patent is extended or adjusted under 35 U.S.C. 154(b) by 149 days.

(21) Appl. No.: 17/476,895

(22) Filed: Sep. 16, 2021

(65) Prior Publication Data

US 2022/0007402 A1 Jan. 6, 2022

Related U.S. Application Data

(62) Division of application No. 16/406,544, filed on May 8, 2019, now abandoned.

(Continued)

(51) Int. Cl.
*H04W 72/21* (2023.01)
*H01Q 1/24* (2006.01)
(Continued)

(52) U.S. Cl.
CPC ............ *H04W 72/21* (2023.01); *H01Q 1/243* (2013.01); *H04W 84/042* (2013.01); *H04W 88/02* (2013.01)

(58) Field of Classification Search
CPC ... H04W 72/21; H04W 84/042; H04W 88/02; H01Q 1/243; H04L 5/00; H04L 5/0023; H04L 5/0051; H04B 7/0608
See application file for complete search history.

(56) References Cited

U.S. PATENT DOCUMENTS

| 10,999,886 | B2 | 5/2021 | Gaal et al. |
| 2011/0255431 | A1 | 10/2011 | Wang et al. |

(Continued)

FOREIGN PATENT DOCUMENTS

| CN | 102714587 A | 10/2012 |
| CN | 103430468 A | 12/2013 |

(Continued)

OTHER PUBLICATIONS

Huawei et al., "Antenna selection transmission for PUSCH", 3GPP Draft; R1-1801810, 3rd Generation Partnership Project (3GPP), Mobile Competence Centre ; 650, Route Des Lucioles; F-06921 Sophia-Antipolis Cedex; France, vol. RAN WG1, No. Athens, Greece; Feb. 26, 2018-Mar. 2, 2018, Feb. 16, 2018 (Feb. 16, 2018), XP051397433, Retrieved from the Internet: URL:http://www.3gpp.org/ftp/tsg%5Fran/WG1%5FRL1/TSGR1%5F92/Docs/ [retrieved on Feb. 16, 2018], pp. 2-4.

(Continued)

*Primary Examiner* — Rina C Pancholi

(57) ABSTRACT

Certain aspects of the present disclosure provide techniques for selecting an antenna configuration for transmitting in a wireless communication network. An example technique may include determining that a front guard period is not scheduled between a scheduled uplink transmission and a scheduled sounding reference signal (SRS) transmission, and based on the determination, transmitting the scheduled SRS transmission using a first antenna configuration after transmitting the scheduled uplink transmission using the first antenna configuration.

26 Claims, 10 Drawing Sheets

Related U.S. Application Data

(60) Provisional application No. 62/669,853, filed on May 10, 2018.

(51) Int. Cl.
*H04W 84/04* (2009.01)
*H04W 88/02* (2009.01)

(56) References Cited

U.S. PATENT DOCUMENTS

| | | | |
|---|---|---|---|
| 2015/0319724 A1 | 11/2015 | Chae et al. | |
| 2016/0344526 A1 | 11/2016 | Fan et al. | |
| 2017/0332371 A1 | 11/2017 | Kubota et al. | |
| 2018/0139752 A1* | 5/2018 | Wang | H04B 7/2643 |
| 2019/0140798 A1* | 5/2019 | Li | H04B 7/0617 |
| 2019/0150131 A1* | 5/2019 | Chen | H04L 5/0092 370/280 |
| 2019/0349972 A1 | 11/2019 | Nam et al. | |
| 2020/0322187 A1* | 10/2020 | He | H04W 72/0446 |
| 2020/0382250 A1* | 12/2020 | Choi | H04W 72/21 |

FOREIGN PATENT DOCUMENTS

| | | |
|---|---|---|
| CN | 104871614 A | 8/2015 |
| CN | 107579808 A | 1/2018 |
| EP | 3468087 A1 | 4/2019 |
| EP | 3687099 A1 | 7/2020 |
| TW | 201813328 A | 4/2018 |
| WO | 2016179777 A1 | 11/2016 |
| WO | 2016191135 A | 12/2016 |
| WO | 2017027575 A2 | 2/2017 |
| WO | 2018006752 A1 | 1/2018 |

OTHER PUBLICATIONS

Huawei et al., "SRS Switching for UEs with Multiple Antennas", 3GPP Draft; R1-166133, 3rd Generation Partnership Project (3GPP), Mobile Competence Centre ; 650, Route Des Lucioles; F-06921 Sophia-Antipolis Cedex; France, vol. RAN WG1, No. Gothenburg, Sweden; Aug. 22, 2016-Aug. 26, 2016 Aug. 21, 2016, XP051125229, Retrieved from the Internet: URL:http://www.3gpp.org/ftp/Meetings_ 3GPP_SYNC/RAN1/Docs/ [retrieved on Aug. 21, 2016], 2 pages.
International Preliminary Report on Patentability—PCT/US2019/031492, The International Bureau of WIPO—Geneva, Switzerland, Nov. 19, 2020.
International Search Report and Written Opinion—PCT/US2019/031492—ISA/EPO—Oct. 23, 2019.
Partial International Search Report—PCT/US2019/031492—ISA/EPO—Jul. 22, 2019.
Taiwan Search Report—TW108116034—TIPO—Oct. 21, 2022.
Taiwan Search Report—TW108116034—TIPO—May 16, 2024.

\* cited by examiner

900 ⟶

902 ⟶
TRANSMITTING A NETWORK RESOURCE ALLOCATION TO A USER EQUIPMENT (UE), WHEREIN THE NETWORK RESOURCE ALLOCATION COMPRISES AN SRS RESOURCE SET, WHEREIN A FIRST SRS RESOURCE OF THE SRS RESOURCE SET IS SEPARATED FROM A SECOND SRS RESOURCE OF THE SRS RESOURCE SET BY A MIDDLE GUARD PERIOD, AND WHEREIN THE SECOND SRS RESOURCE OF THE SRS RESOURCE SET IS FOLLOWED BY A REAR GUARD PERIOD.

952 ⟶
DETERMINE THAT A REAR GUARD PERIOD IS NOT NEEDED BETWEEN A SCHEDULED SOUNDING REFERENCE SIGNAL (SRS) TRANSMISSION AND A SCHEDULED DOWNLINK TRANSMISSION

954 ⟶
RECEIVE THE SCHEDULED SRS TRANSMISSION FROM A USER EQUIPMENT (UE)

956 ⟶
TRANSMIT THE SCHEDULED DOWNLINK TRANSMISSION AFTER RECEIVING THE SCHEDULED SRS TRANSMISSION WITHOUT OBSERVING AN INTERVENING GUARD PERIOD

FIG. 9B

GUARD PERIOD OPTIMIZATION FOR MULTI-ANTENNA USER EQUIPMENTS

CROSS-REFERENCE TO RELATED APPLICATIONS

This application is a divisional of U.S. patent application Ser. No. 16/406,544, filed May 8, 2019, which claims the benefit of U.S. Provisional Patent Application No. 62/669,853, filed on May 10, 2018, the contents of each of which are incorporated herein by reference in their entirety.

INTRODUCTION

Field of the Disclosure

Aspects of the present disclosure relate to wireless communications, and more particularly, to techniques for selectively scheduling guard periods for user equipments with multiple antennas.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method of selecting an antenna configuration for transmitting in a wireless communication network, including: determining that a front guard period is not scheduled between a scheduled uplink transmission and a scheduled sounding reference signal (SRS) transmission; and based on the determination, transmitting the scheduled SRS transmission using a first antenna configuration after transmitting the scheduled uplink transmission using the first antenna configuration.

Other aspects provide a method of selecting an antenna configuration for transmitting in a wireless communication network, comprising: determining that a rear guard period is not needed between a scheduled sounding reference signal (SRS) transmission and a scheduled downlink transmission; transmitting the scheduled SRS transmission using a first antenna configuration; changing from the first antenna configuration to a second antenna configuration; and receiving the scheduled downlink transmission using the second antenna configuration without observing an intervening guard period.

Still other aspects provide a method of scheduling networking resources in a wireless communication network, comprising: transmitting a network resource allocation to a user equipment (UE), wherein the network resource allocation comprises an SRS resource set, wherein a first SRS resource of the SRS resource set is separated from a second SRS resource of the SRS resource set by a middle guard period, and wherein the second SRS resource of the SRS resource set is followed by a rear guard period.

Further aspects provide a method of scheduling network resources in a wireless communication network, comprising: determining, by a base station, that a rear guard period is not needed between a scheduled sounding reference signal (SRS) transmission and a scheduled downlink transmission; receiving the scheduled SRS transmission from a user equipment (UE); transmitting, from the base station, the scheduled downlink transmission after receiving the scheduled SRS transmission without observing an intervening guard period.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 9A depicts a method of scheduling networking resources in a wireless communication network FIG. 9B depicts another method of scheduling network resources in a wireless communication network.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
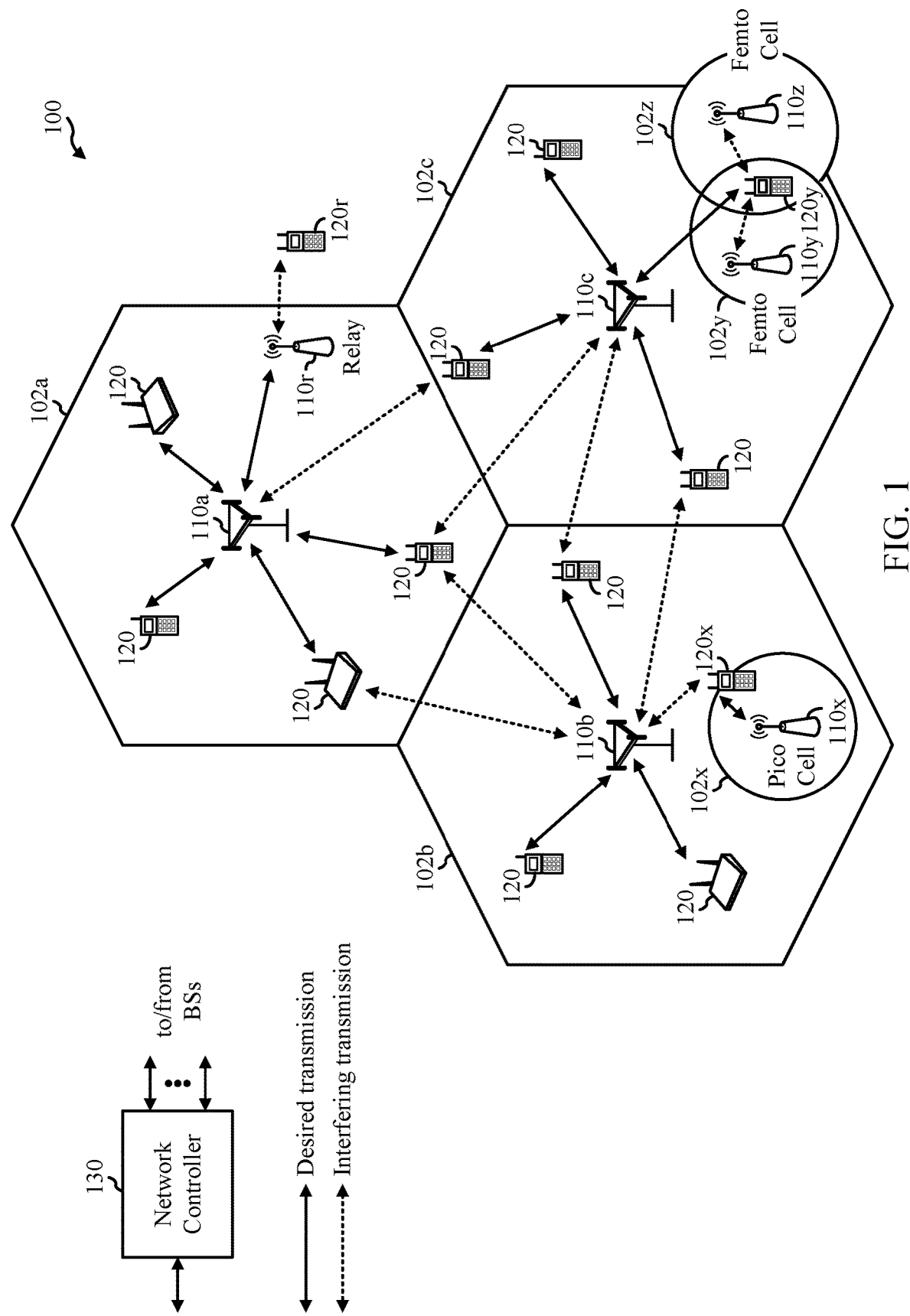
FIG. 1 is a block diagram conceptually illustrating an example telecommunications system, in accordance with certain aspects of the present disclosure.

Aspects of the present disclosure provide apparatus, methods, processing systems, and computer readable mediums for selectively scheduling guard periods for user equipments with multiple antennas.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. In some examples, network 100 may be configured to implement methods as described below with respect to FIGS. 8A-8B and 9A-9B.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
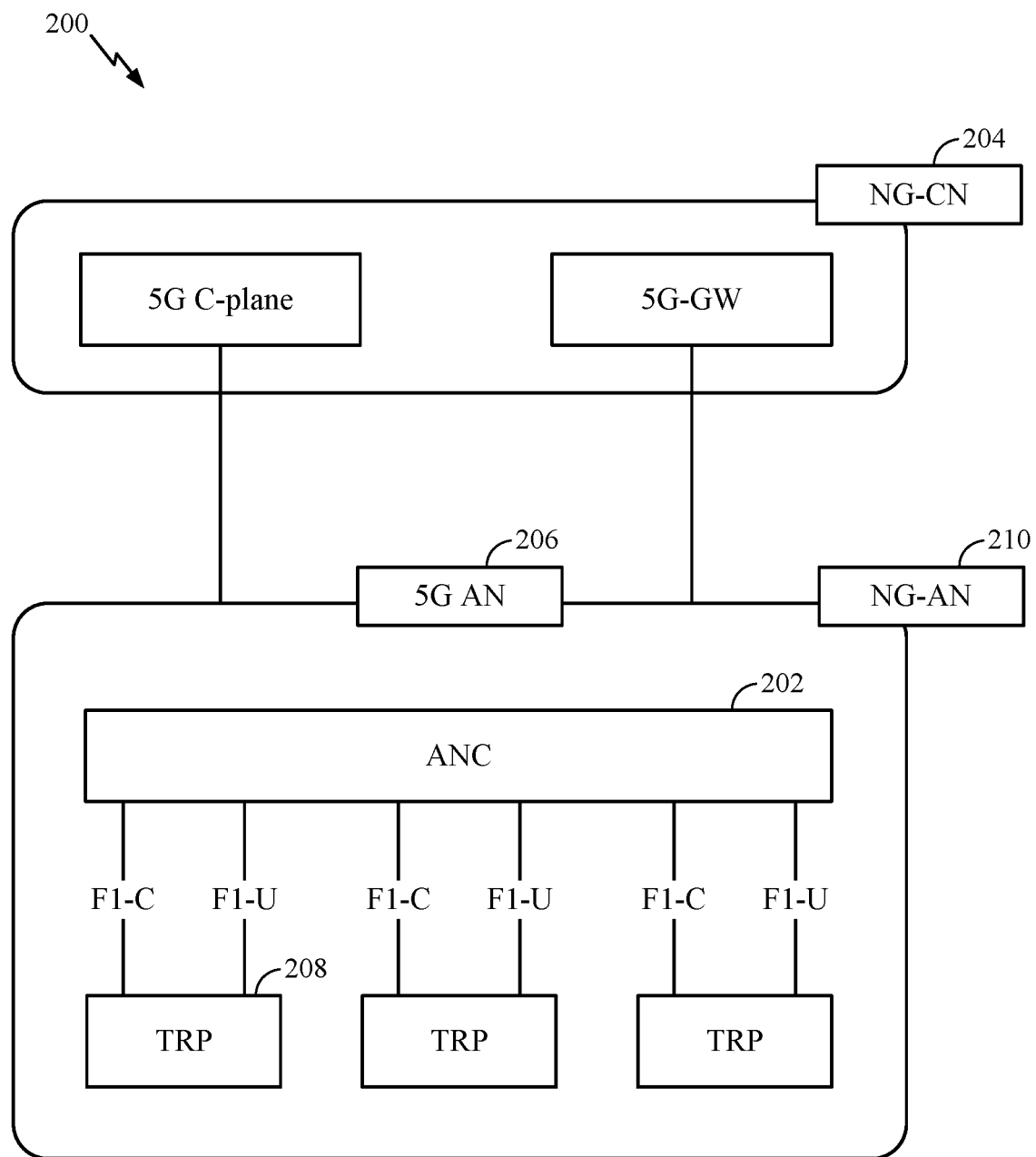
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
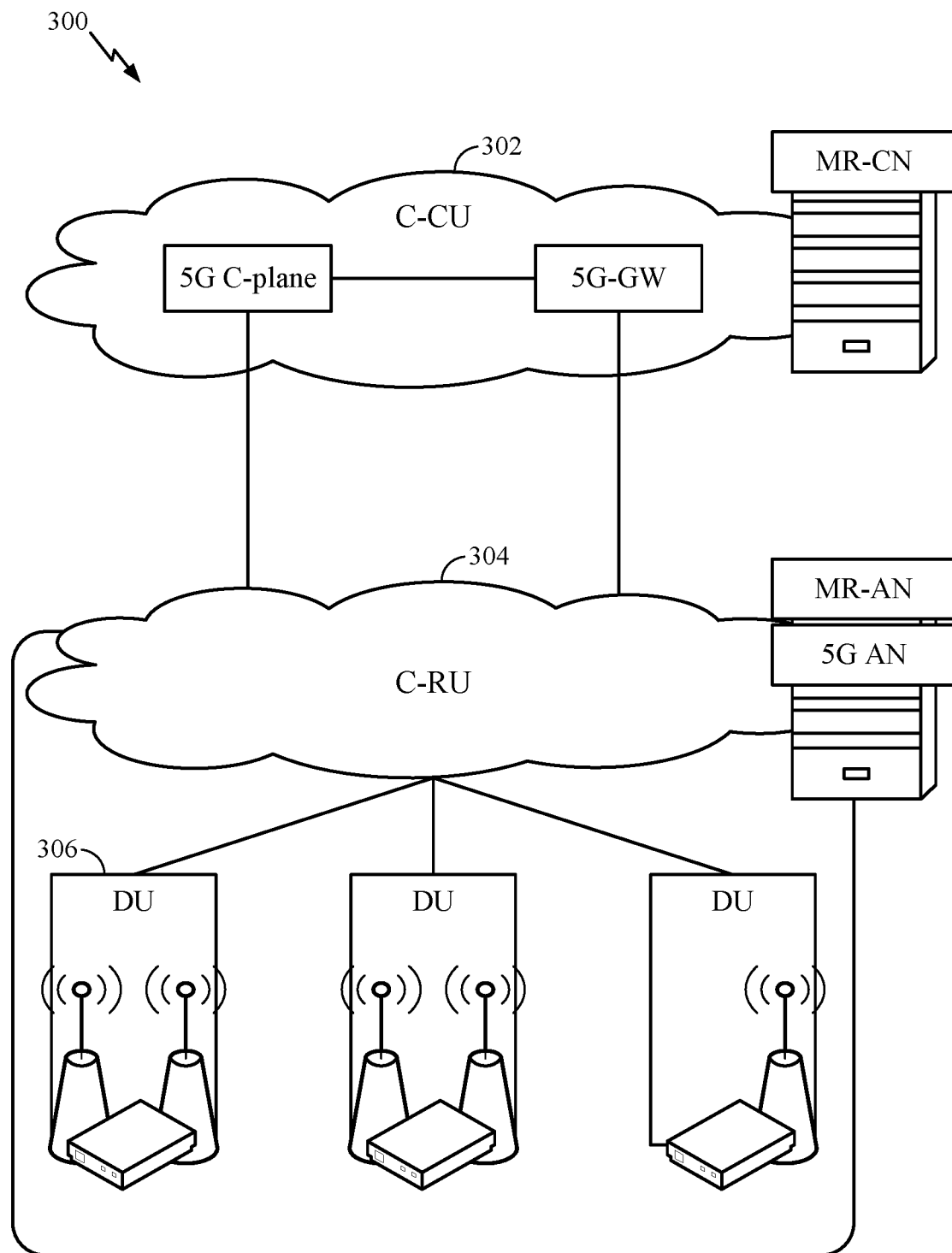
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
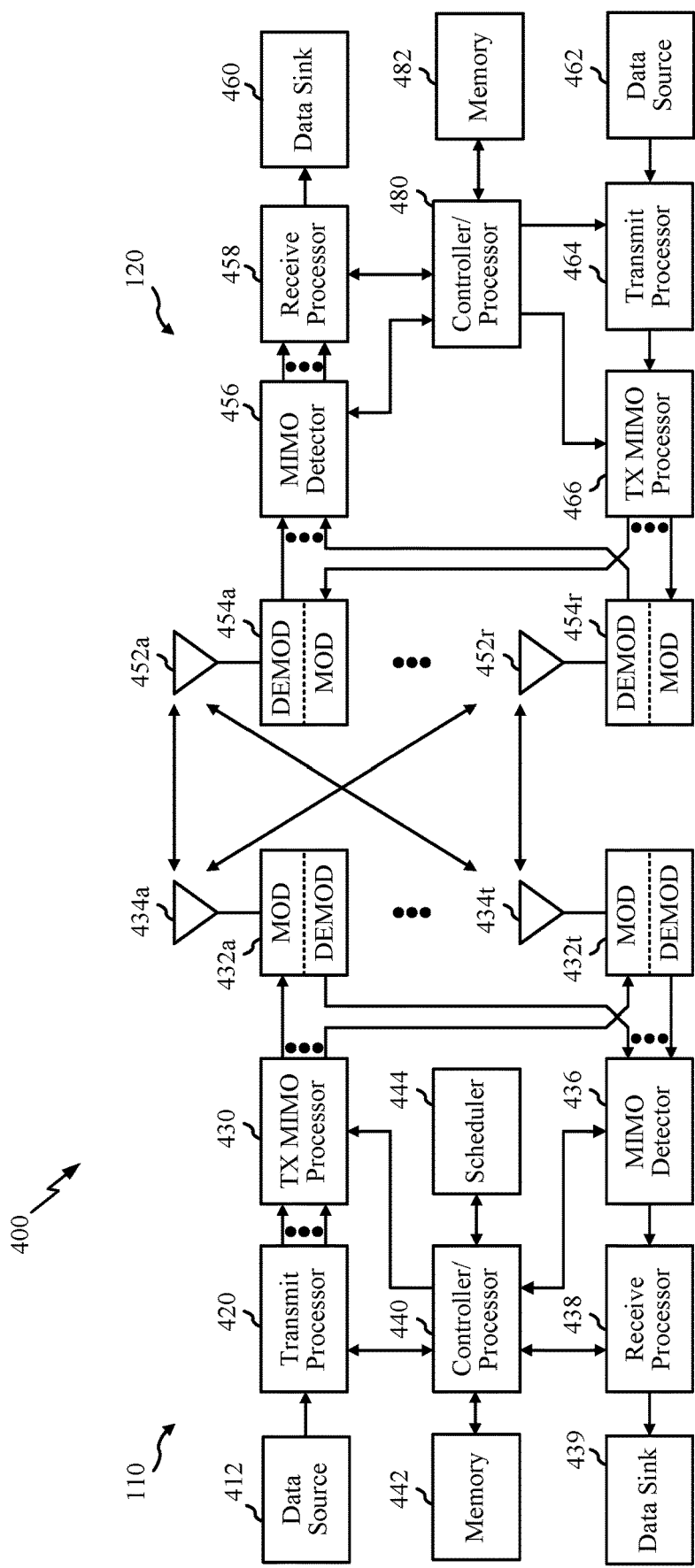
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein, such as described with respect to FIGS. 8A-8B and 9A-9B.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
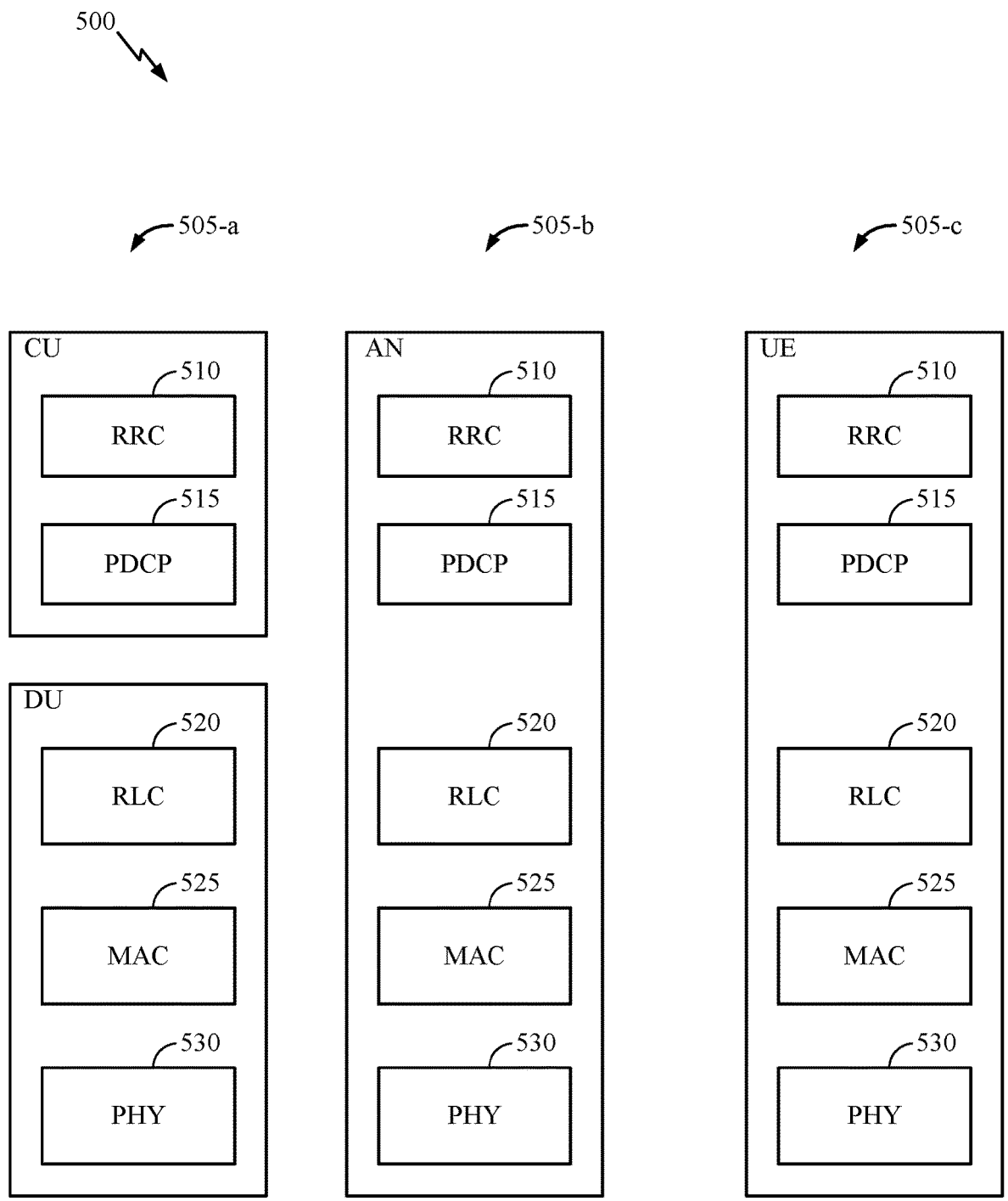
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
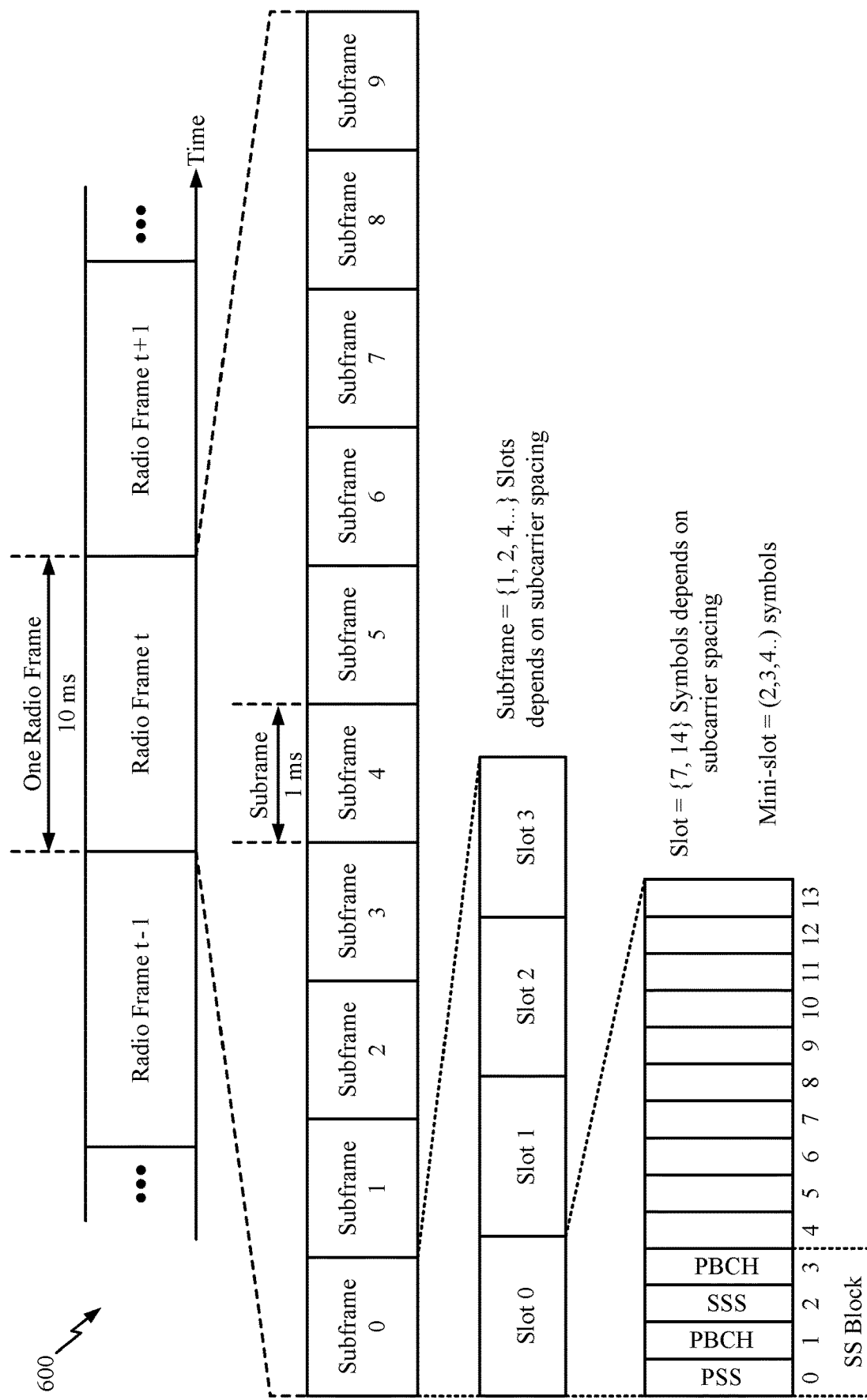
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Systems and Methods for Selectively Scheduling Guard Periods for User Equipments with Multiple Antennas Modern user equipments (UEs) may include a plurality of antennas. One or more of the plurality of antennas may be used for transmitting (e.g., $N_{TX}$=number of transmission antennas) data in a wireless network, such as described with respect to FIG. 1, and likewise one or more of the plurality of antennas may be used for receiving (e.g., $N_{RX}$=number of receiving antennas) data in the wireless network. In some cases, different sets of antennas are used for consecutive transmissions or receptions, which may generally be referred to as "antenna switching."

In a wireless communication network, such as an NR network, UEs may support sounding reference signal (SRS) transmissions with antenna switching. For example, in the case where $N_{TX}<N_{RX}$, SRS transmissions may be performed with antenna switching. In other words, a UE may transmit a first set of SRS resources using a first transmit antenna or set of antennas, and a second set of SRS resources using a second antenna, or set of antennas.

Different capabilities of UEs may be pre-defined, such as for use in standards defining capabilities of a wireless communication network like NR. For example, a UE may be configured to transmit on one of two antennas and to receive on both of the two antennas (referred to in shorthand as "1T2R"), or a UE may be configured to transmit on two of four antennas and to receive on all four of the antennas ("2T4R"), or a UE may be configured to transmit on one of four antennas and to receive on all four of the antennas ("1T4R"), and so on. Different combinations of transmit and receive capability for different numbers of antennas are possible. In some cases, the capabilities may be set for a UE by the network in downlink control information (DCI), for example using a "SRS-SetUse" resource indicator field.

A UE with multiple antennas can be configured with an SRS resource set that comprises one or more SRS resources for transmission from its multiple antennas. In some cases, a first resource of an SRS resource set may be configured for a first antenna configuration and a second resource of an SRS resource set may be configured for a second antenna configuration. Thus, SRS resource sets may support antenna switching in UEs.

UEs with multiple antennas may also be configured with multiple SRS resource sets. For example, a UE with two antennas may be configured with one SRS resource set (e.g., in a 1T2R configuration), whereas a UE with four antennas may be configured with more than one SRS resource set (e.g., in a 1T4R configuration).

SRS resources in a set are generally transmitted by a UE in the same slot, but separated by a guard period. During a guard period, the UE does not transmit any other signal, which allows for transition and settling time (e.g., between transmitting and receiving or between changing antenna configurations). For example, the guard period may include Y or at least Y intervening OFDM symbols that separate the SRS resource transmissions. By way of example, Y may be set to 2 for 120 kHz subcarrier spacing (e.g., for above-6 Ghz mmWave frequency ranges) and Y may be set to 1 for 15, 30, or 60 Khz (e.g., in sub-6 Ghz frequency ranges or in above-6 Ghz mmWave frequency ranges where the subcarrier spacing is 60 Khz). Other configurations are possible.

Guard Period Placement and Scheduling

It may be desirable to place a guard period between any transmissions from a UE where there is an antenna switching event. Conventional guard periods may be scheduled between each individual SRS resource in an SRS resource sets (e.g., in UEs with multiple-antenna configurations), but these conventional guard periods may not account for antenna switching events before transmitting the first resource in the resource set and after transmitting the last resource in the resource set. Thus, additional or supplemental guard periods may be scheduled before the first SRS resource in a resource set, and after the last SRS resource in the resource set. For example, a guard period may be set before a first SRS resource in a resource set when there is an uplink transmission (e.g., PUSCH) from the same UE before the first SRS resource transmission and the first SRS resource transmission uses a different antenna configuration (i.e., an antenna switch) from the uplink transmission. As another example, a guard period may be set after the last SRS resource in a resource set when switching from an uplink (UL) transmission mode to a downlink (DL) reception mode. In some configurations, the additional guard periods may all be the same number of OFDM symbols (Y) in length.

There are several options for implementing the additional guard periods. One or more of these options may be implemented within an existing telecommunication standard or within a new telecommunication standard. A first option is by schedule restriction. In other words, a base station (BS) (such as described above with respect to FIGS. 1 and 4) may not schedule or configure a UE with any other UL transmissions, such as PUCCH and PUSCH transmissions, within Y symbols before the first SRS resource transmission in an SRS resource set or after the last SRS resource transmission in the SRS resource set.

A second option for providing the additional guard periods is by way of configuration of the SRS resource set itself. For example, the configuration of an SRS resource set for antenna switching may include zero-power ("dummy") SRS resources before and after the first and the last non-zero-power SRS resources in the set. The zero-power SRS resources emulate guard periods because the UE will not actually transmit any data (owing to the zero power) during that period.

Overhead Reduction Methods when Implementing Additional Guard Periods for Antenna Switching While adding additional guard periods may be implemented in baseline or standard cases, there may be special or specific cases where additional guard periods can be avoided in order to reduce network overhead. In such cases, instead of additional guard periods, additional data symbols may be transmitted. In this way, the overall system may flexibly implement additional guard periods for antenna switching when necessary, but may forgo such additional guard periods when unnecessary in order to increase network utilization.

Figure 7A:
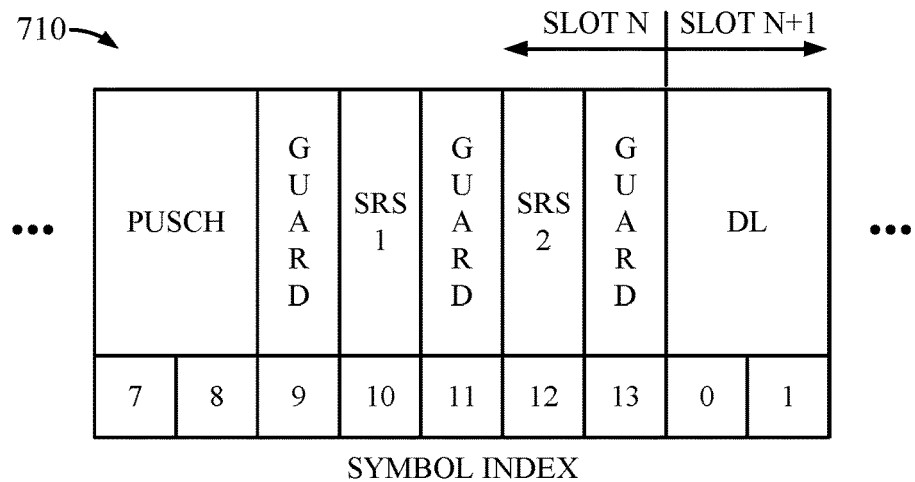
FIG. 7A depicts a portion of a network resource block, which includes additional guard periods.

FIG. 7A depicts a portion of a network resource block 710 spanning two slots (N and N+1), which includes additional guard periods. Across the bottom of FIG. 7A is a symbol index, which indicates the symbol of the particular slot (in this case N or N+1). Note that while in this example each slot has 14 symbols (in index spots 0-13), in other embodiments there may be different numbers of symbols in a slot.

In FIG. 7A, there is a conventional guard period at symbol index 11 between SRS resources SRS 1 and SRS 2, which are part of an SRS resource set. This conventional guard period may provide time for a UE (such as those described with reference to the figures above) to switch from one antenna configuration to another antenna configuration. Additional guard periods are placed or scheduled at symbol indexes 9 and 13. In particular, the guard period at symbol index 9 may be referred to as a forward or front guard period, which precedes the first SRS resource in an SRS resource set (here, SRS 1). The front guard period may correspond to the case that the base station wants to give the UE a chance to try different antenna combinations between the PUSCH transmission and the SRS 1 transmission. Or, for example, in 2T4R configuration case, the PUSCH may be scheduled with one transmission antenna while the SRS 1 is configured with 2 transmission antennas. As discussed above, because in the latter case the numbers of antennas are different, there is an "antenna switching" event that requires a guard period.

The guard period at symbol index 13 in FIG. 7A may be referred to as a back or rear guard period, which follows the last SRS resource in the SRS resource set (here, SRS 2).

For example, the front guard period at symbol index 9 may allow for time to switch an antenna configuration from the PUSCH transmission at symbol indexes 7 and 8 and the SRS resource (SRS 1) transmission at symbol index 10. As another example, the rear guard period at symbol index 13 may allow for time to switch to another antenna configuration from the SRS resource (SRS 2) transmission at symbol index 12 and the downlink (DL) reception at symbol indexes 0 and 1 of Slot N+1.

Figure 7B:
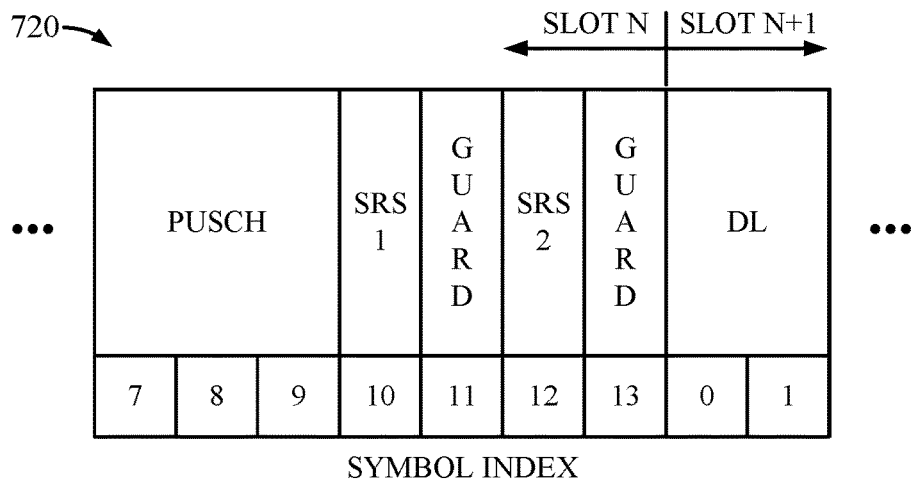
FIG. 7B depicts a portion of a network resource block, which includes an additional guard period and an omitted guard period.

FIG. 7B depicts a portion of a network resource block 720 spanning two slots (N and N+1), which includes an additional guard period. However, unlike the example in FIG. 7A, FIG. 7B depicts a special case where the front guard period is omitted. In particular, in this case the PUSCH is scheduled at symbol indexes 7-9 (one more than in FIG. 7A) because the front guard period (at symbol index 9 in FIG. 7A) is eliminated. In such a case, the UE may determine that because no guard period is scheduled between the PUSCH transmission (at symbol indexes 7-9) and the first SRS resource (SRS 1) transmission (at symbol index 10), that the UE should use the same antenna configuration for both the PUSCH transmission and the SRS 1 transmission. So, for example, in the case of an UE configured for 1T2R and 1T4R, the same antenna should be used, or in the case of 2T4R, the same pair of antenna should be used. In some cases, the UE may infer this because, without the guard period, the UE would not have sufficient time to switch antenna configurations.

As depicted in FIG. 7B, the UE may infer an antenna configuration from the lack of the front guard period where the baseline or standard case would call for a front guard period (i.e., between the PUSCH and the SRS 1 transmissions, as in FIG. 7A). By contrast, in a case such as depicted in FIG. 7A, where there is a front guard period (at symbol index 9), the UE could not infer that the same transmit antennas for the PUSCH transmission and the SRS 1 transmission could be used. Note that while in this example the PUSCH precedes the SRS 1 transmission, any other sort of transmission could precede the SRS 1 transmission, such as a PUCCH transmission.

Further, as explained above, there are two options for placing an effective guard period before a transmission. The example explained above follows the first option of scheduling the guard period. The second option, configuring the SRS resource set without a zero-power SRS resource preceding the SRS 1 transmission, is equally applicable. In other words, the existence or non-existence of the guard period may be implemented through many means.

Figure 7C:
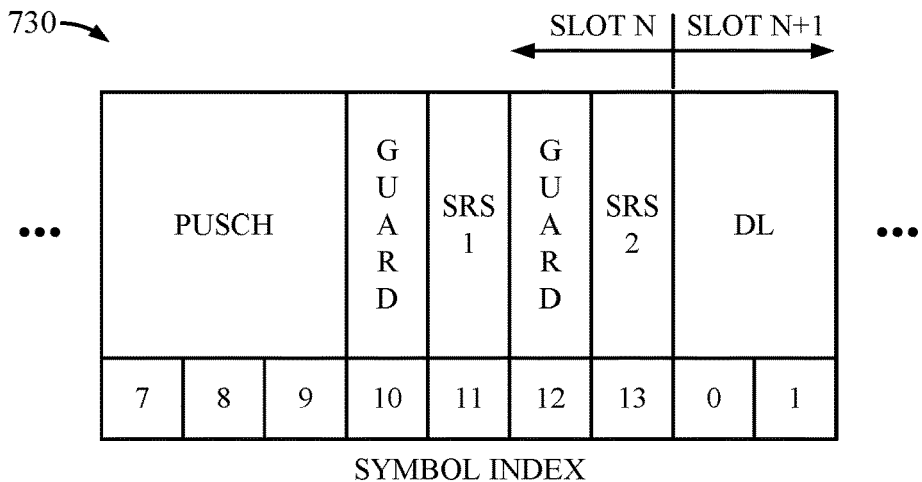
FIG. 7C depicts a portion of a network resource block, which includes an additional guard period and an omitted guard period.

FIG. 7C depicts a portion of a network resource block 730 spanning two slots (N and N+1), which includes an additional guard period. However, unlike the example in FIG. 7A or FIG. 7B, FIG. 7C depicts a special case where the rear guard period is omitted. Here again, the PUSCH is scheduled at symbol indexes 7-9 (one more than in FIG. 7A) because the rear guard period (at symbol index 13 in FIG. 7A) is eliminated.

The rear guard period may be omitted or removed under a variety of special cases. For example, if the UE has sufficient time between the uplink transmission and the downlink reception, for example because of a large propagation delay between the base station and the UE, the rear guard period may be removed. As another example, if the UE is not required to receive any downlink signal in the first downlink symbol (e.g., if the UE is not set for PDCCH monitoring or there is no PDSCH), then the rear guard period may be removed. As yet another example, the UE may indicate to the base station that no rear guard period is necessary through uplink signaling, such as RRC or MAC-CE.

As above there are at least two options for implementing the removal of the rear guard period. First, the UE may be informed by, for example, downlink control information (DCI) that the rear guard period should not be used; thus the removal of the rear guard period may be based on a scheduling instruction. Second, the SRS resource set may be configured without a rear zero-power SRS resource; thus the removal of the rear guard period may also be configuration-based.

Figure 8A:
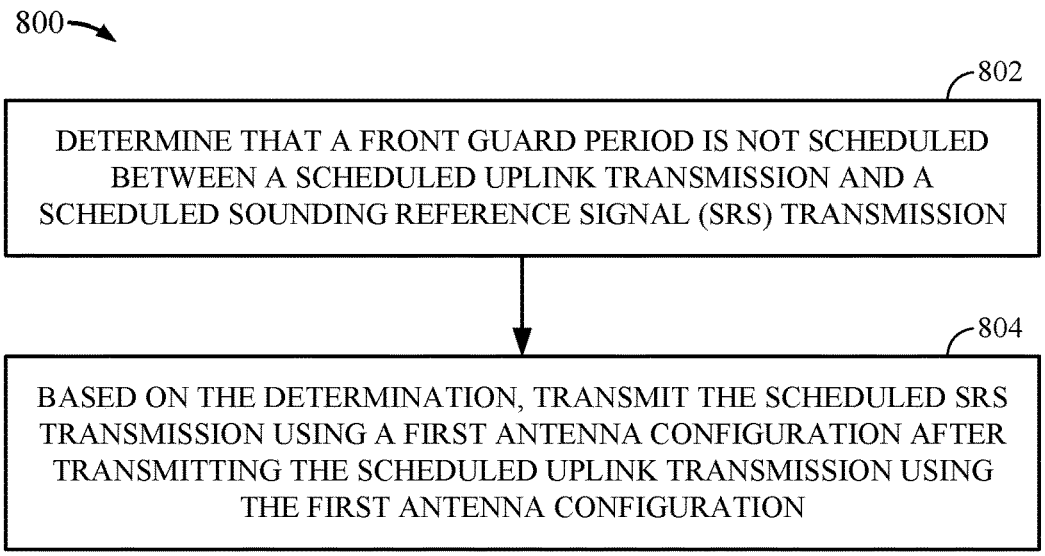
FIG. 8A depicts a method of selecting an antenna configuration for transmitting in a wireless communication network.

FIG. 8A depicts a method 800 of selecting an antenna configuration for transmitting in a wireless communication network.

The method begins at step 802 with determining that a front guard period is not scheduled between a scheduled uplink transmission and a scheduled sounding reference signal (SRS) transmission. For example, as depicted in FIG. 7B, there is no front guard period before the first SRS resource (SRS 1) at symbol index 10.

The method then proceeds to step 804 where, based on the determination, the scheduled SRS transmission is transmitted using a first antenna configuration after (e.g., in the next OFDM symbol) transmitting the scheduled uplink transmission using the first antenna configuration (i.e., the same antenna configuration is used for the scheduled uplink transmission and the scheduled SRS transmission). For example, as depicted in FIG. 7B, the SRS 1 transmission at symbol index 10 is transmitted after the PUSCH uplink transmission ending at symbol index 9.

Though not depicted in FIG. 8A, method 800 may further include changing the antenna configuration during a middle guard period following the transmission of the scheduled SRS transmission. For example, as depicted in FIG. 7B, the antenna configuration may be changed during the guard period at symbol index 11.

Also not depicted in FIG. 8A, method 800 may also include receiving a network resource allocation from a network. In some examples, the network resource allocation comprises an SRS resource set, and in some examples a first SRS resource of the SRS resource set is separated from a second SRS resource of the SRS resource set by a middle guard period. For example, as depicted in FIG. 7B, the first SRS (SRS 1) resource at symbol index 10 is separated from the second SRS resource (SRS 2) at symbol index 12 by the guard period at symbol index 11. In some examples, the second SRS resource of the SRS resource set is followed (e.g., in the next OFDM symbol) by a rear guard period. For example, as depicted in FIG. 7B, the second SRS resource (SRS 2) at symbol index 12 is followed by the rear guard period at symbol index 13. In some examples of method 800, the rear guard period comprises a zero-power SRS resource, as discussed above.

In some examples, method 800 is performed by a UE within an NR wireless communication network.

Figure 8B:
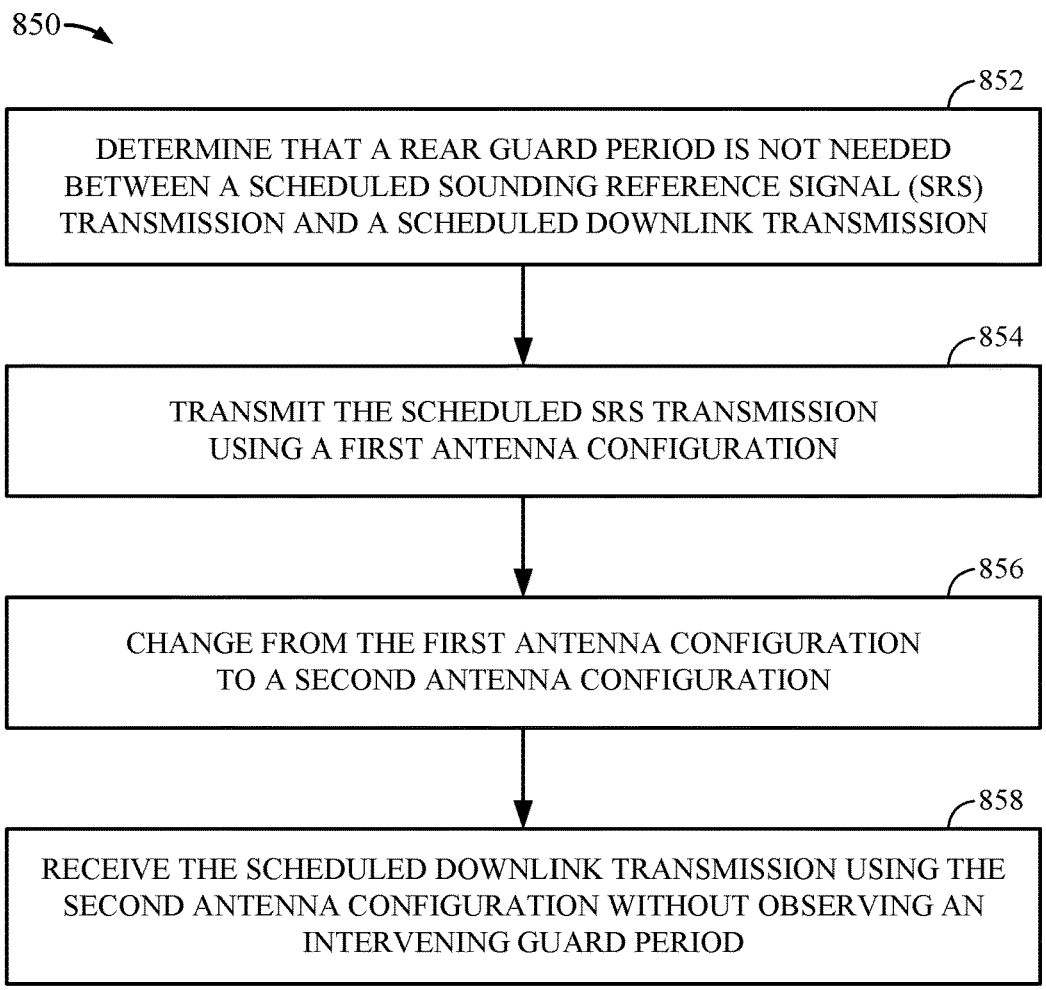
FIG. 8B depicts another method of selecting an antenna configuration for transmitting in a wireless communication network.

FIG. 8B depicts another method 850 of selecting an antenna configuration for transmitting in a wireless communication network. The method 850 begins at step 852 with determining that a rear guard period is not needed between a scheduled sounding reference signal (SRS) transmission and a scheduled downlink transmission.

Method 850 then proceeds to step 854 where the scheduled SRS transmission is transmitted using a first antenna configuration. For example, as depicted in FIG. 7C, the SRS resource (SRS 2) at symbol index 13 may be transmitted using a first antenna configuration for transmission.

Method 850 then proceeds to step 856, where the first antenna configuration is changed to a second antenna configuration. For example, a different antenna may be selected where a device, such as a user equipment, has multiple antennas that can be used for transmission and reception.

Method 850 then proceeds to step 858 where the scheduled downlink transmission is received using the second antenna configuration without observing an intervening guard period. For example, as depicted in FIG. 7C, downlink data at symbols 0 and 1 of slot N+1 may be received after (e.g., in the next OFDM symbol) transmitting SRS resource (SRS 2) at symbol index 13 in slot N. Notably, while the SRS 2 transmission and downlink (DL) reception are in adjacent symbol periods in FIG. 7C, there may nevertheless be a time interval (e.g., gap) between the transmission and the reception from the perspective of the UE because of the roundtrip time between the UE and the base station (which is twice the propagation delay).

In some examples of method 850, determining that the rear guard period is not needed includes determining a propagation delay between a base station and a user equipment (UE) is sufficient to allow for changing between the first antenna configuration and the second antenna configuration without the rear guard period.

In other examples of method 850, determining that the rear guard period is not needed comprises receiving downlink control information (DCI) from a base station indicating that the rear guard period is not needed.

In yet other examples of method 850, determining that the rear guard period is not needed comprises determining that it is not necessary to receive the first symbol of the scheduled downlink transmission.

Though not depicted in FIG. 8B, method 850 may also include receiving a network resource allocation from a network. In some examples, the network resource allocation comprises an SRS resource set, wherein a first SRS resource of the SRS resource set is separated from a second SRS resource of the SRS resource set by a middle guard period. For example, as depicted in FIG. 7C, a first SRS resource (SRS 1) at symbol index 11 is separated from a second SRS resource (SRS 2) at symbol index 13 by a middle guard period at symbol index 12. Further, in some examples, the first SRS resource of the SRS resource set is preceded by a front guard period. For example, as depicted in FIG. 7C, the first SRS resource (SRS 1) at symbol index 11 is preceded by a front guard period at symbol index 10. In some examples, the front guard period comprises a zero-power SRS resource.

In some examples, method 850 is performed by a UE within an NR wireless communication network.

FIG. 9A depicts a method 900 of scheduling networking resources in a wireless communication network. The method 900 begins at step 902 with transmitting a network resource allocation to a user equipment (UE). For example, the network allocation may comprise resource blocks or other forms of scheduling data, such as depicted in FIGS. 7A-7C.

In some examples of method 900, the network resource allocation comprises an SRS resource set. In some examples, the SRS resource set may include multiple SRS reference signals configured for different antenna configurations of a UE. For example, FIGS. 7A-7C depict resource sets including SRS 1 and SRS 2, which may be individually configured for different antenna configurations.

In some examples of method 900, a first SRS resource of the SRS resource set is separated from a second SRS resource of the SRS resource set by a middle guard period (such as described above with respect to FIGS. 7A-7C).

In some examples of method 900, the second SRS resource of the SRS resource set is followed by a rear guard period (such as described above with respect to FIG. 7B). In some examples, the rear guard period comprises a zero-power SRS resource.

Though not depicted in FIG. 9A, method 900 may further include receiving the scheduled SRS transmission from the UE after receiving the scheduled uplink from the UE. For example, as depicted in FIG. 7B, the SRS 1 transmission at symbol index 10 may be received after receiving the PUSCH uplink transmission ending at symbol index 9.

In some examples, method 900 is performed by a base station in an NR wireless communication network.

FIG. 9B depicts another method 950 of scheduling network resources in a wireless communication network.

Method 950 begins at step 952 with determining that a rear guard period is not needed between a scheduled sounding reference signal (SRS) transmission and a scheduled downlink transmission.

Method 950 then proceeds to step 954 where the scheduled SRS transmission is received, for example, from a user equipment (UE).

Method 950 then proceeds to step 956 where the scheduled downlink transmission is transmitted, for example, from a base station, after receiving the scheduled SRS transmission without observing an intervening guard period. For example, as depicted in FIG. 7C, the downlink transmission at symbols 0 and 1 of Slot N+1 are transmitted after receiving the SRS resource (SRS 2) at symbol index 13 of Slot N.

In some examples of method 950, determining that the rear guard period is not needed comprises determining a propagation delay between a base station and a UE is sufficient to allow the UE to change between a first antenna configuration for transmitting and a second antenna configuration for receiving without the rear guard period.

Though not depicted in FIG. 9B, method 950 may also include transmitting downlink control information (DCI) from the base station to the UE indicating that the rear guard period is not needed.

In some examples of method 950, determining that the rear guard period is not needed comprises determining that it is not necessary to transmit the first symbol of the scheduled downlink transmission to the UE. For example, with respect to FIG. 7C, it may be determined that the first symbol of the downlink transmission at symbol index 0 of Slot N+1 need not be transmitted.

Though not depicted in FIG. 9B, method 950 may also include transmitting a network resource allocation to the UE. In some examples, the network resource allocation comprises an SRS resource set, wherein a first SRS resource of the SRS resource set is separated from a second SRS resource of the SRS resource set by a middle guard period, and wherein the first SRS resource of the SRS resource set is preceded by a front guard period. For example, as depicted in FIG. 7C, the resource set including SRS 1 and SRS 2 is separated by a middle guard period at symbol index 12, and SRS 1 at symbol index 11 is preceded by the front guard period at symbol index 10. In some examples, the front guard period comprises a zero-power SRS resource.

In some examples, method 950 is performed by a base station in an NR wireless communication network.

Figure 10:
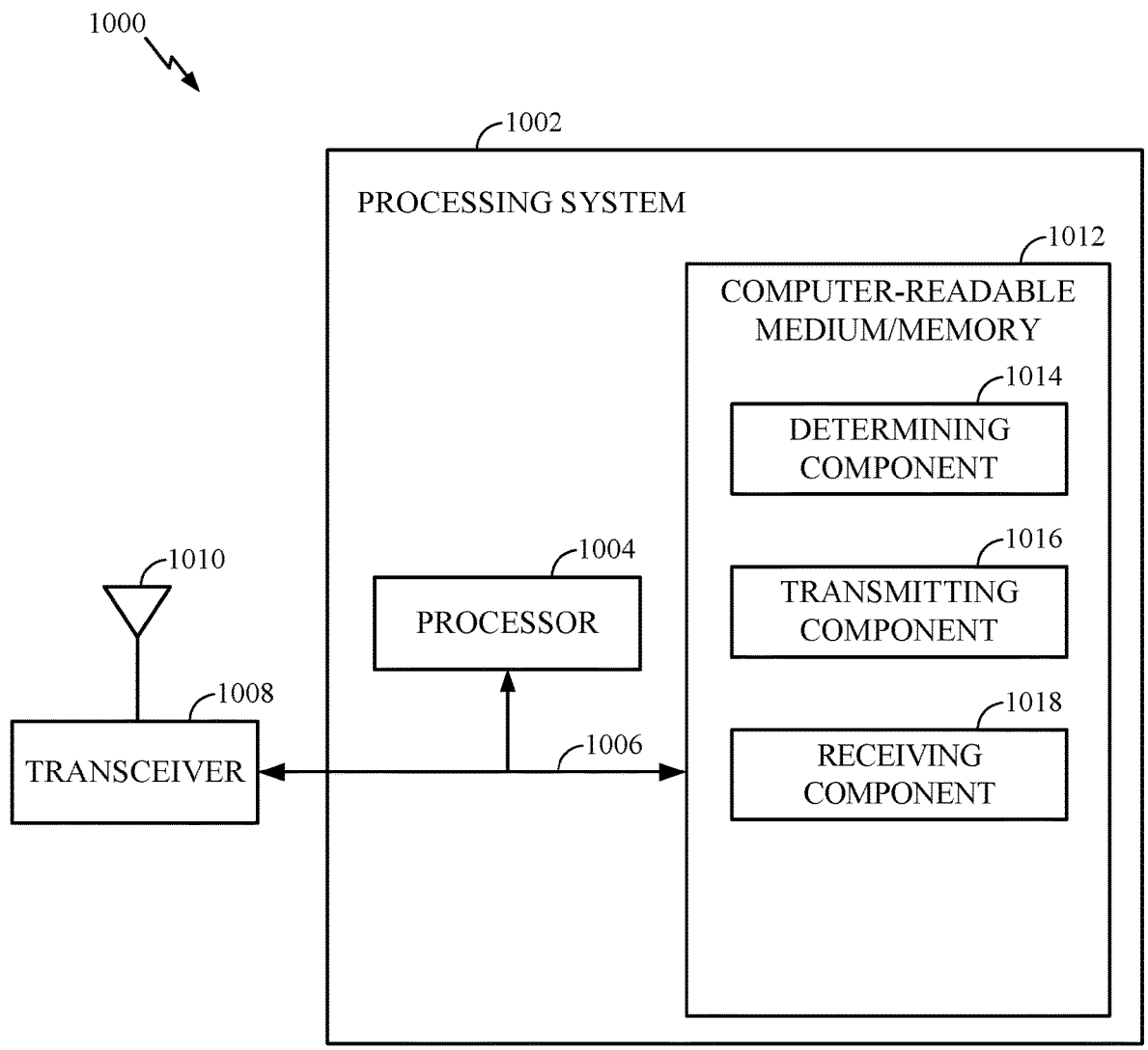
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIGS. 8A-8B and 9A-9B. The communications device 1000 includes a processing system 1002 coupled to a transceiver 1008. The transceiver 1008 is configured to transmit and receive signals for the communications device 1000 via an antenna 1010, such as the various signal described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions that when executed by processor 1004, cause the processor 1004 to perform the operations illustrated in FIGS. 8A-8B and 9A-9B, or other operations for performing the various techniques discussed herein.

In certain aspects, the processing system 1002 further includes a determining component 1014 for performing the operations illustrated in FIGS. 8A-8B and 9A-9B. Additionally, the processing system 1002 includes a transmitting component 1016 for performing the operations illustrated in FIGS. 8A-8B and 9A-9B. Additionally, the processing system 1002 includes a receiving component 1018 for performing the operations illustrated in FIGS. 8A-8B and 9A-9B. The determining component 1014, transmitting component 1016, and receiving component 1018 may be coupled to the processor 1004 via bus 1006. In certain aspects, the determining component 1014, transmitting component 1016, and receiving component 1018 may be hardware circuits. In certain aspects, the determining component 1014, transmitting component 1016, and receiving component 1018 may be software components that are executed and run on processor 1004.

Example Embodiments

The following are example embodiments. Even if single claim dependencies are indicated in the following examples, or in the claims below, all claim dependencies, including multiple claim dependencies, are included within the scope of the present disclosure.

Embodiment 1: A method of selecting an antenna configuration for transmitting in a wireless communication network, comprising: determining that a front guard period is not scheduled between a scheduled uplink transmission and a scheduled sounding reference signal (SRS) transmission; and based on the determination, transmitting the scheduled SRS transmission using a first antenna configuration after transmitting the scheduled uplink transmission using the first antenna configuration.

Embodiment 2: The method of Embodiment 1, further comprising: changing the antenna configuration during a middle guard period following the transmitting the scheduled SRS transmission.

Embodiment 3: The method of any of Embodiments 1-2, further comprising: receiving a network resource allocation from a network, wherein the network resource allocation comprises an SRS resource set, wherein a first SRS resource of the SRS resource set is separated from a second SRS resource of the SRS resource set by a middle guard period, and wherein the second SRS resource of the SRS resource set is followed by a rear guard period.

Embodiment 4: The method of Embodiment 3, wherein the rear guard period comprises a zero power SRS resource.

Embodiment 5: The method of any of Embodiments 1-4, wherein the wireless communication network is an NR network.

Embodiment 6: A method of selecting an antenna configuration for transmitting in a wireless communication network, comprising: determining that a rear guard period is not needed between a scheduled sounding reference signal (SRS) transmission and a scheduled downlink transmission; transmitting the scheduled SRS transmission using a first antenna configuration; changing from the first antenna configuration to a second antenna configuration; and receiving the scheduled downlink transmission using the second antenna configuration without observing an intervening guard period.

Embodiment 7: The method of Embodiment 6, wherein determining that the rear guard period is not needed comprises determining a propagation delay between a base station and a user equipment is sufficient to allow for changing between the first antenna configuration and the second antenna configuration without the rear guard period.

Embodiment 8: The method of any of Embodiments 6-7, wherein determining that the rear guard period is not needed comprises receiving downlink control information (DCI) from a base station indicating that the rear guard period is not needed.

Embodiment 9: The method of any of Embodiments 6-8, wherein determining that the rear guard period is not needed comprises determining that it is not necessary to receive a first symbol of the scheduled downlink transmission.

Embodiment 10: The method of any of Embodiments 6-9, further comprising: receiving a network resource allocation from a network, wherein the network resource allocation comprises an SRS resource set, wherein a first SRS resource of the SRS resource set is separated from a second SRS resource of the SRS resource set by a middle guard period, and wherein the first SRS resource of the SRS resource set is preceded by a front guard period.

Embodiment 11: The method of Embodiment 10, wherein the front guard period comprises a zero-power SRS resource.

Embodiment 12: The method of any of Embodiments 6-11, wherein the wireless communication network is an NR network.

Embodiment 13: A method of scheduling networking resources in a wireless communication network, comprising: transmitting a network resource allocation to a user equipment (UE), wherein the network resource allocation comprises an SRS resource set, wherein a first SRS resource of the SRS resource set is separated from a second SRS resource of the SRS resource set by a middle guard period, and wherein the second SRS resource of the SRS resource set is followed by a rear guard period.

Embodiment 14: The method of Embodiment 13, further comprising: receiving a scheduled SRS transmission from the UE after receiving a scheduled uplink from the UE.

Embodiment 15: The method of any of Embodiments 13-14, wherein the rear guard period comprises a zero-power SRS resource.

Embodiment 16: The method of any of Embodiments 13-15, wherein the wireless communication network is an NR network.

Embodiment 17: A method of scheduling network resources in a wireless communication network, comprising: determining, by a base station, that a rear guard period is not needed between a scheduled sounding reference signal (SRS) transmission and a scheduled downlink transmission; receiving the scheduled SRS transmission from a user equipment (UE); and transmitting, from the base station, the scheduled downlink transmission after receiving the scheduled SRS transmission without observing an intervening guard period.

Embodiment 18: The method of Embodiment 17, wherein determining that the rear guard period is not needed comprises determining a propagation delay between the base station and the UE is sufficient to allow the UE to change between a first antenna configuration for transmitting and a second antenna configuration for receiving without the rear guard period.

Embodiment 19: The method of any of Embodiments 17-18, further comprising: transmitting downlink control information (DCI) from the base station to the UE indicating that the rear guard period is not needed.

Embodiment 20: The method of any of Embodiments 17-19, wherein determining that the rear guard period is not needed comprises determining that it is not necessary to transmit a first symbol of the scheduled downlink transmission to the UE.

Embodiment 21: The method of any of Embodiments 17-20, further comprising: transmitting a network resource allocation to the UE, wherein the network resource allocation comprises an SRS resource set, wherein a first SRS resource of the SRS resource set is separated from a second SRS resource of the SRS resource set by a middle guard period, and wherein the first SRS resource of the SRS resource set is preceded by a front guard period.

Embodiment 22: The method of Embodiment 21, wherein the front guard period comprises a zero-power SRS resource.

Embodiment 23: The method of any of Embodiments 17-22, wherein the wireless communication network is an NR network.

Further embodiments relate to apparatuses configured to perform the methods described herein as well as non-transitory computer-readable mediums comprising computer-executable instructions that, when executed by a processor of a device, cause the device to perform the methods described herein.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8A-8B and 9A-9B.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of selecting antenna configurations for communicating in a wireless communication network by a user equipment, the method comprising:
   transmitting, to a base station, a scheduled sounding reference signal (SRS) transmission using a first antenna configuration; and
   receiving, from the base station, a scheduled downlink transmission using a second antenna configuration that is different than the first antenna configuration without using a rear guard period between the transmitting of the scheduled SRS transmission and the receiving of the scheduled downlink transmission based on a determination that the rear guard period is not needed between the scheduled SRS transmission and the scheduled downlink transmission, wherein the determination that the rear guard period is not needed is based on a determination that twice a propagation delay between the base station and the user equipment is sufficient to allow for changing between the first antenna configuration and the second antenna configuration without the rear guard period.

2. The method of claim 1, further comprising receiving downlink control information (DCI) from the base station indicating that the rear guard period is not needed, wherein the determination that the rear guard period is not needed is based on receiving the DCI.

3. The method of claim 1, wherein the determination that the rear guard period is not needed is based on a determination that the rear guard period is not necessary to receive a first symbol of the scheduled downlink transmission.

4. The method of claim 1, further comprising receiving a network resource allocation from a network, wherein:
   the network resource allocation comprises an SRS resource set,
   a first SRS resource of the SRS resource set is separated in time from a second SRS resource of the SRS resource set by a middle guard period, and
   the first SRS resource of the SRS resource set is preceded in time by a front guard period.

5. The method of claim 4, wherein the front guard period comprises a zero-power SRS resource.

6. The method of claim 1, wherein the wireless communication network is a 5G new radio network.

7. The method of claim 1, wherein the scheduled SRS transmission is transmitted in at least a last symbol in time of a first slot, wherein the scheduled downlink transmission is received in at least a first symbol in time of a second slot, and wherein the second slot is after and adjacent in time to the first slot.

8. A user equipment comprising:
   a memory; and
   one or more processors coupled to the memory, wherein the one or more processors are, individually or collectively, configured to cause the user equipment to:
      transmit, to a base station, a scheduled sounding reference signal (SRS) transmission using a first antenna configuration; and
      receive, from the base station, a scheduled downlink transmission using a second antenna configuration that is different than the first antenna configuration without using a rear guard period between the transmitting of the scheduled SRS transmission and the receiving of the scheduled downlink transmission based on a determination that the rear guard period is not needed between the scheduled SRS transmission and the scheduled downlink transmission, wherein the determination that the rear guard period is not needed is based on a determination that twice a propagation delay between the base station and the user equipment is sufficient to allow for changing between the first antenna configuration and the second antenna configuration without the rear guard period.

9. The user equipment of claim 8, wherein the one or more processors are further configured to, individually or collectively, cause the user equipment to receive downlink control information (DCI) from the base station indicating that the rear guard period is not needed, wherein the determination that the rear guard period is not needed is based on receiving the DCI.

10. The user equipment of claim 8, wherein the determination that the rear guard period is not needed is based on a determination that the rear guard period is not necessary to receive a first symbol of the scheduled downlink transmission.

11. The user equipment of claim 8, wherein the one or more processors are further configured to, individually or collectively, cause the user equipment to receive a network resource allocation from a network, wherein:
  the network resource allocation comprises an SRS resource set,
  a first SRS resource of the SRS resource set is separated in time from a second SRS resource of the SRS resource set by a middle guard period, and
  the first SRS resource of the SRS resource set is preceded in time by a front guard period.

12. The user equipment of claim 11, wherein the front guard period comprises a zero-power SRS resource.

13. The user equipment of claim 8, wherein the scheduled SRS transmission is transmitted in at least a last symbol in time of a first slot, wherein the scheduled downlink transmission is received in at least a first symbol in time of a second slot, and wherein the second slot is after and adjacent in time to the first slot.

14. A user equipment comprising:
  means for transmitting, to a base station, a scheduled sounding reference signal (SRS) transmission using a first antenna configuration; and
  means for receiving, from the base station, a scheduled downlink transmission using a second antenna configuration that is different than the first antenna configuration without using a rear guard period between the transmitting of the scheduled SRS transmission and the receiving of the scheduled downlink transmission based on a determination that the rear guard period is not needed between the scheduled SRS transmission and the scheduled downlink transmission, wherein the determination that the rear guard period is not needed is based on a determination that twice a propagation delay between the base station and the user equipment is sufficient to allow for changing between the first antenna configuration and the second antenna configuration without the rear guard period.

15. The user equipment of claim 14, further comprising means for receiving downlink control information (DCI) from the base station indicating that the rear guard period is not needed, wherein the determination that the rear guard period is not needed is based on receiving the DCI.

16. The user equipment of claim 14, wherein the determination that the rear guard period is not needed is based on a determination that the rear guard period is not necessary to receive a first symbol of the scheduled downlink transmission.

17. The user equipment of claim 14, further comprising means for receiving a network resource allocation from a network, wherein:
  the network resource allocation comprises an SRS resource set,
  a first SRS resource of the SRS resource set is separated in time from a second SRS resource of the SRS resource set by a middle guard period, and
  the first SRS resource of the SRS resource set is preceded in time by a front guard period.

18. The user equipment of claim 17, wherein the front guard period comprises a zero-power SRS resource.

19. The user equipment of claim 14, wherein the scheduled SRS transmission is transmitted in at least a last symbol in time of a first slot, wherein the scheduled downlink transmission is received in at least a first symbol in time of a second slot, and wherein the second slot is after and adjacent in time to the first slot.

20. A non-transitory computer readable medium comprising instructions, that when executed by a user equipment, cause the user equipment to perform a method of selecting antenna configurations for communicating in a wireless communication network, the method comprising:
  transmitting, to the base station, a scheduled sounding reference signal (SRS) transmission using a first antenna configuration; and
  receiving, from the base station, a scheduled downlink transmission using a second antenna configuration that is different than the first antenna configuration without using a rear guard period between the transmitting of the scheduled SRS transmission and the receiving of the scheduled downlink transmission based on a determination that the rear guard period is not needed between the scheduled SRS transmission and the scheduled downlink transmission, wherein the determination that the rear guard period is not needed is based on a determination that twice a propagation delay between the base station and the user equipment is sufficient to allow for changing between the first antenna configuration and the second antenna configuration without the rear guard period.

21. The non-transitory computer readable medium of claim 20, the method further comprising receiving downlink control information (DCI) from the base station indicating that the rear guard period is not needed, wherein the determination that the rear guard period is not needed is based on receiving the DCI.

22. The non-transitory computer readable medium of claim 20, wherein the determination that the rear guard period is not needed is based on a determination that the rear guard period is not necessary to receive a first symbol of the scheduled downlink transmission.

23. The non-transitory computer readable medium of claim 20, the method further comprising receiving a network resource allocation from a network, wherein:
  the network resource allocation comprises an SRS resource set,
  a first SRS resource of the SRS resource set is separated in time from a second SRS resource of the SRS resource set by a middle guard period, and
  the first SRS resource of the SRS resource set is preceded in time by a front guard period.

24. The non-transitory computer readable medium of claim 23, wherein the front guard period comprises a zero-power SRS resource.

25. The non-transitory computer readable medium of claim 20, wherein the wireless communication network is a 5G new radio network.

26. The non-transitory computer readable medium of claim 20, wherein the scheduled SRS transmission is transmitted in at least a last symbol in time of a first slot, wherein the scheduled downlink transmission is received in at least a first symbol in time of a second slot, and wherein the second slot is after and adjacent in time to the first slot.

* * * * *